United States Patent
Yamakawa et al.

(10) Patent No.: US 8,947,803 B1
(45) Date of Patent: Feb. 3, 2015

(54) DATA STORAGE DEVICE AND DATA ERASING METHOD

(71) Applicant: Kabushiki Kaisha Toshiba, Tokyo (JP)

(72) Inventors: Teruji Yamakawa, Tokyo (JP); Osamu Yoshida, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/190,575

(22) Filed: Feb. 26, 2014

(30) Foreign Application Priority Data

Sep. 6, 2013 (JP) .................................. 2013-185106

(51) Int. Cl.
*G11B 27/36* (2006.01)
(52) U.S. Cl.
USPC ............................................. 360/31; 360/66
(58) Field of Classification Search
None
See application file for complete search history.

(56) References Cited

U.S. PATENT DOCUMENTS

| | | | | |
|---|---|---|---|---|
| 4,858,220 | A * | 8/1989 | Funada | 369/116 |
| 5,508,984 | A * | 4/1996 | Goto | 369/47.13 |
| 7,006,757 | B2 * | 2/2006 | Ando et al. | 386/252 |
| 2001/0014070 | A1 * | 8/2001 | Ando et al. | 369/59.25 |
| 2002/0024892 | A1 * | 2/2002 | Ando et al. | 369/30.25 |
| 2004/0101273 | A1 * | 5/2004 | Winter et al. | 386/46 |
| 2006/0274623 | A1 * | 12/2006 | Perez et al. | 369/59.11 |
| 2008/0297940 | A1 * | 12/2008 | Kojima | 360/75 |
| 2012/0170435 | A1 * | 7/2012 | Trantham | 369/53.42 |

FOREIGN PATENT DOCUMENTS

| | | | |
|---|---|---|---|
| JP | 2002-312128 A | 10/2002 | |
| JP | 2005-018415 A | 1/2005 | |

* cited by examiner

*Primary Examiner* — Paul Huber
(74) *Attorney, Agent, or Firm* — Patterson & Sheridan, LLP (57) ABSTRACT

A data storage device includes a recording medium including a data region for recording data and a nonvolatile recording unit distinct from the data region. In response to a request for executing erase processing with respect to the recording medium, first time information corresponding to initiation of the erase processing in the nonvolatile recording unit is stored, the erase processing after storing the first time information is executed, and second time information corresponding to completion of the erase processing is stored in the nonvolatile recording unit.

20 Claims, 6 Drawing Sheets

| EXE-CUTION NUMBER | COMMAND RECEPTION TIME | ERASE START TIME | ERASE COMPLETION TIME | STATUS | START LBA | COMPLETION LBA |

DATA STORAGE DEVICE AND DATA ERASING METHOD

CROSS-REFERENCE TO RELATED APPLICATION

This application is based upon and claims the benefit of priority from Japanese Patent Application No. 2013-185106, filed Sep. 6, 2013; the entire contents of which are incorporated herein by reference.

FIELD

Embodiments described herein relate to a data storage device and a data erasing method.

BACKGROUND

In recent years, in a data storage device such as hard disc drives (HDDs), technologies which prevent recorded data from being read by a third party are commonly used. For example, in order to prevent recorded data from being read after discarding a data storage device, a process causing the recorded data to be unreadable is performed before the data storage device is discarded. As such a method, a method of physically destroying the data storage device, or a method of recording a specific pattern (for example, a pattern of all zeros) in all recording regions and overwriting recorded data (erase processing) are typically used. When considering reusing the data storage device, the latter method is applied. However, a method of determining whether an erase process has been reliably executed with respect to a data storage device after the erase process is complete is not currently known in the art.

DETAILED DESCRIPTION

Embodiments provide a data storage device and a data erasing method which can suitably guarantee that the erase processing is reliably executed. This is useful, e.g., in assuring users that private and confidential information, once stored in the data storage device, has been erased.

According to one embodiment, a data storage device includes: a recording medium including a data region for recording data; a nonvolatile recording unit distinct from the data region; and a controller that is configured to control recording of the data to the data region. In response to a request for executing an erase process on the recording medium, the controller causes first time information corresponding to a start time of the erase process in the nonvolatile recording unit to be stored. The controller also executes the erase process after storing the first time information, and causes second time information corresponding to a completion state of the erase process to be stored in the nonvolatile recording unit.

Hereinafter, several embodiments will be described with reference to the accompanying drawings. It should be noted that the embodiments are not limited to the following embodiments, and can be implemented by modifying some or all components without departing from the spirit of the exemplary embodiment. In addition, various exemplary embodiments can be formed by any suitable combination of a plurality of components disclosed in the following embodiments. For example, some components may be removed from some embodiments. Furthermore, components according to different embodiments may be appropriately combined.

Figure 1:
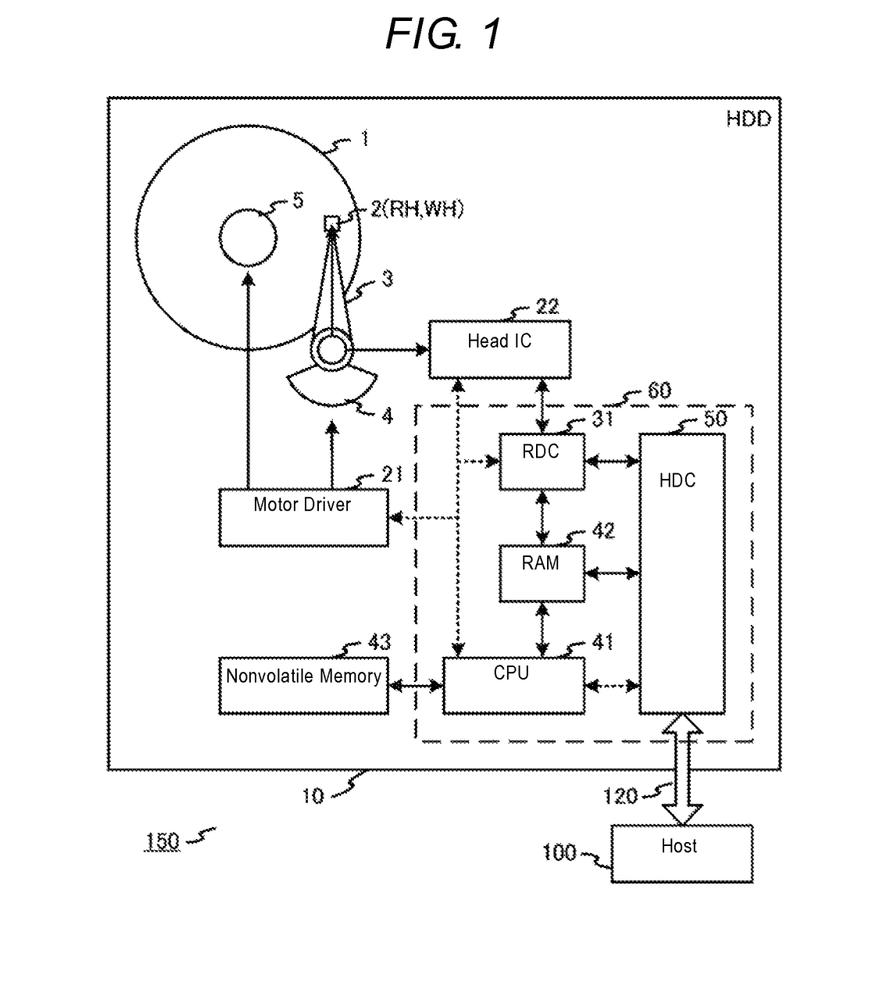
FIG. 1 is a block diagram showing a configuration of an electronic system including a magnetic disk device (HDD) that is a data storage device according to an embodiment.

FIG. 1 is a block diagram showing a configuration of an electronic system 150 including a magnetic disk device 10 (hereinafter, referred to as "HDD") as a data storage device according to an embodiment. The electronic system 150 includes a host 100 and the HDD 10. A host I/F 120 connects the host 100 and the HDD 10, and is used in transmission and reception of commands and user data between the host 100 and the HDD 10. The host I/F 120 is based upon serial advanced technology attachment (SATA) standard and serial attached SCSI (SAS) standards. The HDD 10 is connected to the host 100 through the host I/F 120 to function as a data storage device of the host 100. For example, the electronic system 150 is a personal computer or a mobile computing device, and the host 100 is a chip set IC that is provided in the personal computer or the like.

The HDD 10 includes a head-disk assembly (HDA) including a magnetic disk 1, a slider 2, an arm 3, a voice coil motor (VCM) 4, and a spindle motor (SPM) 5. In addition, the HDD 10 includes a circuit module including a motor driver 21, a head IC 22, a nonvolatile memory 43, and a controller 60.

The controller 60 includes a read-write channel IC (hereinafter, referred to as "RDC") 31, a CPU 41, a RAM 42, and a hard disc controller (HDC) 50. As the RAM 42, DRAM (SDRAM) or SRAM is utilized that is a volatile memory capable of higher-speed data transmission than a magnetic disk 1. The nonvolatile memory 43 may be a nonvolatile recording unit, and as the nonvolatile memory 43, a semiconductor memory such as a flash memory or a NAND memory or a partial recording region of the magnetic disk 1.

The HDD 10 according to an embodiment executes a process for recording data in the magnetic disk 1 (i.e., a write process), and a process for overwriting data recorded by a specific erase pattern (i.e., an erase process, for example, recording a data pattern of all zeros) on all recording regions of the magnetic disk 1. The write process and the erase process are executed in response to commands transmitted from the host 100 through the host I/F 120. Such processes are controlled by a program (firmware) executed by the CPU 41. Data associated with such a program is stored in the nonvolatile memory 43 or the magnetic disk 1.

The magnetic disk 1 is rotated by the SPM 5. The SPM 5 is driven and controlled by a driving current from the motor driver 21. The arm 3 and the VCM 4 constitute an actuator. The actuator moves (seeks) a head (not shown) mounted in the slider 2 to a target position on the magnetic disk 1. That is, the actuator moves the slider 2 (more specifically, head)

mounted in the arm 3 in a radial direction on the disk 1 by driving of the VCM 4. The VCM 4 is driven and controlled by the driving current from the motor driver 21.

In the magnetic disk 1, a plurality of cylinders (tracks) in which data is recorded are provided. The magnetic disk 1 includes a system region for recording management data including data related to operations of the HDD 10 and data related to the write process and the erase process and a data region for recording user data transmitted from the host 100. The magnetic disk 1 is configured as a recording medium for recording data. In addition, the management data may be recorded in the nonvolatile memory 43 instead of the system region. The management data may be expanded in the RAM 42 during operation of the HDD 10, and may be recorded (copied) in the nonvolatile memory 43 (for example, the nonvolatile recording unit from the RAM 42 or in the system region of the magnetic disk 1) to safeguard against a loss of power to the HDD 10 (more specifically, RAM 42).

The head includes a read head RH and a write head WH which are mounted in the slider 2 using the slider 2 as a main body. The read head RH reads data recorded in the cylinder on the magnetic disk 1. The read data is servo information or user data. The write head WH writes the user data on the magnetic disk 1. The read head RH is configured as a reading unit and the write head WH is configured as a recording unit.

The head IC 22 includes a read amplifier and a write driver (both not shown). The read amplifier amplifies read signals read by the read head RH, and transmits the amplified read signals to the RDC 31. The write driver transmits, to the write head WH, a write current corresponding to write data output from the RDC 31.

The controller 60 includes a one-chip integrated circuit including the RDC 31, the CPU 41, the RAM 42, and the HDC 50. The RDC 31 includes a read channel and a write channel (both not shown). The read channel decodes data (including servo information) by processing the read signal read by the read head RH. The write channel executes signal processing of the write data from the HDC 50. The RAM 42 may be provided outside of the controller 60.

The HDC 50 controls data transmission between the host 100 and the RDC 31 by controlling the RAM 42. The HDC 50 executes data transmission control by temporarily storing the read data and the write data in the RAM 42. In addition, the HDC 50 executes storage and reading of programs and device parameters which are executed, for example, by the CPU 41 by controlling the nonvolatile memory 43. The HDC 50 is configured as an interface unit for controlling transmission and receipt of commands and data between the host 100 and the HDD 10.

The CPU 41 is also referred to as a microprocessor or a microcontroller. The CPU 41 executes positioning control (servo control) of the head by controlling the VCM 4 through the motor driver 21. In addition, the CPU 41 controls the write process and the erase process on the magnetic disk 1 through the RDC 31. In addition, the CPU 41 has a counter for measuring a life timer value representing a cumulative operating time of the HDD 10, based on a clock generated inside the HDD10. The counter may be provided in other circuit modules instead of the CPU 41 including the counter. The CPU 41 controls such processing using HDA or the circuit module according to the program.

With the above-described configuration, the HDD 10 according to the embodiment may execute multiple types of processes, which are described below.

Figure 2:
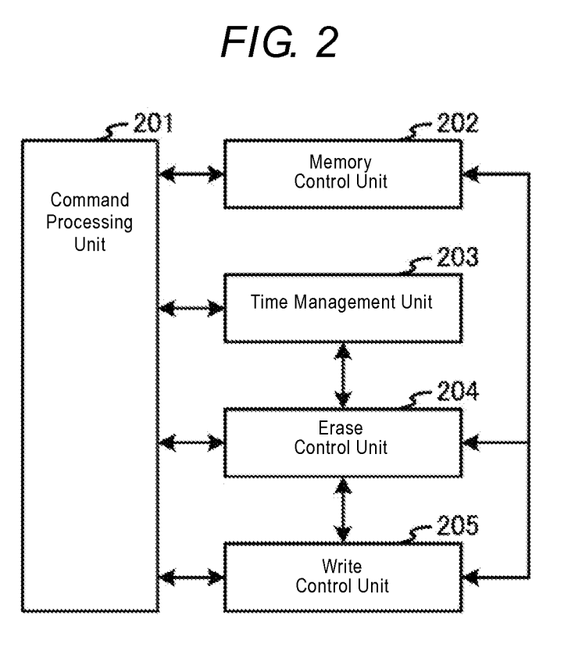
FIG. 2 is a configuration diagram illustrating a module that executes an erase process according to an embodiment.

Next, referring to FIG. 2, a module which is provided in the HDD 10 according to the embodiment and executes an erase process will be described. FIG. 2 is a configuration diagram illustrating a module that executes an erase process according to an embodiment.

The HDD 10 includes a command processing unit 201, a memory control unit 202, a time management unit 203, an erase control unit 204, and a write control unit 205. Such a module includes the HDA, the circuit module, or a program executed by the CPU 41 which the HDD 10 has. That is, the erase processing according to the embodiment is executed by such a module.

The command processing unit 201 notifies the memory control unit 202, the time management unit 203, the erase control unit 204, or the write control unit 205 of a request for executing processing according to a command transmitted from the host 100 or according to processing required inside the HDD 10. In addition, the command processing unit 201 transmits a response command to the host in response to a notification from the memory control unit 202, the time management unit 203, the erase control unit 204, or the write control unit 205. The command processing unit 201 notifies the erase control unit 204 of, for example, a request for executing processing according to an erase command transmitted from the host 100. When receiving the erase command from the host 100, the command processing unit 201 requests current time data from the time management unit 203, and notifies the memory control unit 202 of the acquired current time data.

The memory control unit 202 controls data transmission and reception with the RAM 42 or the nonvolatile memory 43. The memory control unit 202 transmits and receives data with the RAM 42 or the nonvolatile memory 43 during the erase process by the erase control unit 204 or the write process by the write control unit 205. In addition, the memory control unit 202 transmits data read from the RAM 42 or the nonvolatile memory 43 to the command processing unit 201 in response to a request from the command processing unit 201. Further, the memory control unit 202 stores the current time data received from the command processing unit 201 or the erase control unit 204 in the RAM 42 or the nonvolatile memory 43.

The time management unit 203 computes the current time in response to the notification from the command processing unit 201, based on data indicating a time transmitted from the host 100 and the life timer value by the counter provided inside the HDD 10. In other words, the time management unit 203 computes the current time by synchronizing the data indicating the time transmitted from the host 100 and the life timer value. The time management unit 203 transmits the current time data to a request source in response to a request from the command processing unit 201 or the erase control unit 204, as part of the erase process.

The erase control unit 204 executes the erase processing with respect to the magnetic disk 1 in response to the notification from the command processing unit 201. The erase control unit 204 requests the current time data from the time management unit 203 that indicates the progress of the erase processing, and notifies the memory control unit 202 of the acquired current time data. Specifically, the erase control unit 204 transmits to the memory control unit 202 the current time data acquired upon start and completion of the erase processing. The erase control unit 204 may allow the write control unit 205 to execute recording of the erase pattern with respect to the magnetic disk 1 in the erase processing.

The write control unit 205 executes write processing on a portion of the magnetic disk 1 in response to the notification from the command processing unit 201. The write control unit 205 determines whether a request for the write processing received from the command processing unit 201 is an initial request after executing the erase processing. In making this determination, the write control unit 205 uses the data read from the RAM 42 or the nonvolatile memory 43 through the memory control unit 202. In addition, the write control unit 205 may execute recording of the erase pattern on the magnetic disk 1 in the erase process, based on an instruction from the erase control unit 204.

According to the data storage device and the data erasing method according to some embodiments, using the above-described configuration, it is possible to suitably guarantee that the erase process is reliably executed.

Figure 3:
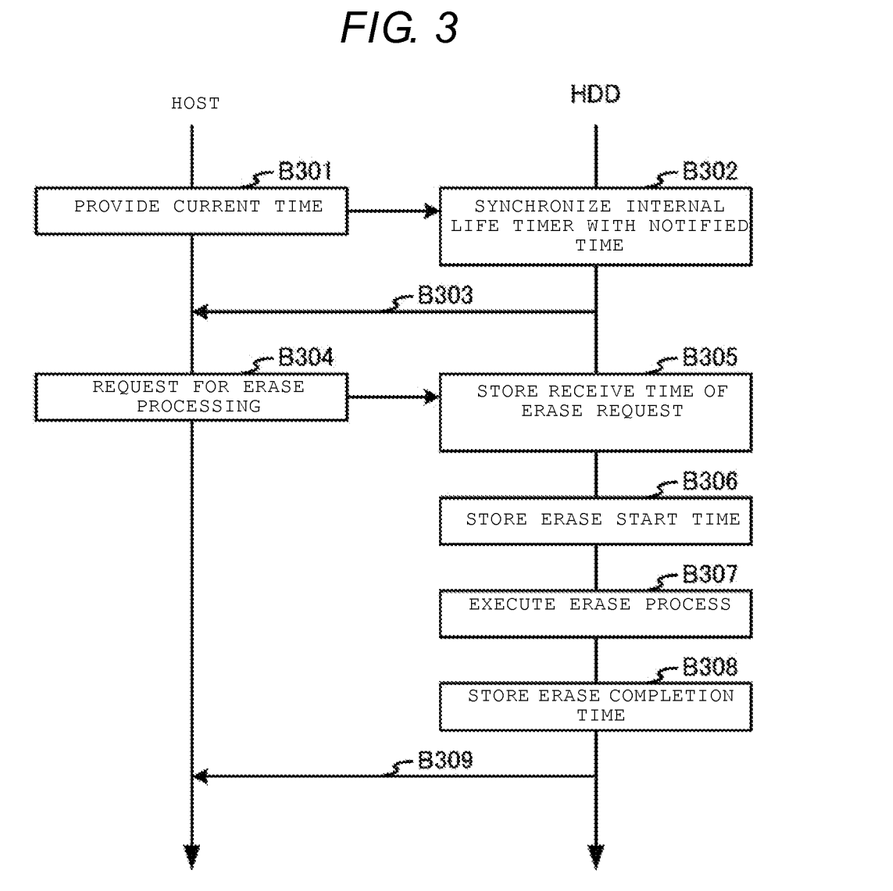
FIG. 3 is a sequence diagram showing an example of an erase process by an electronic system according to an embodiment.

Next, referring to FIG. 3, an example of an erase process executed in the electronic system according to an embodiment will be described. FIG. 3 is a sequence diagram showing an example erase processing operation according to an embodiment.

An erase process, according to the embodiment, is executed by the HDD 10 upon receiving the command transmitted from the host 100. In an erase-process, a current time is managed based on the progress of the erase process in the HDD 10. Hereinafter, an example erase process will be described in detail.

First, in B301, current time data indicating the current time is provided to the HDD 10 from the host 100. In B302, the HDD 10 that has received the current time data determines the current time by synchronizing the current time data transmitted from the host 100 with the life timer value using the counter provided inside the HDD 10. Next, in B303, a message indicating that the determination of the current time is completed is transmitted from the HDD 10 to the host 100.

Thereafter, in B304, a request for executing the erase process is transmitted from the host 100 to the HDD 10. In B305, the HDD 10 that has received this request stores receive time data indicating when the request for executing the erase process in the nonvolatile recording unit is received (for example, the RAM 42 or the nonvolatile memory 43). Subsequently, in B306, the HDD 10 stores a time indicating when the execution of the erase process is started, and executes the erase process in B307. In B308, when the execution of the erase process is completed, the HDD 10 stores a time indicating when the execution of the erase process is completed. Next, in B309, a message indicating that the erase processing is successfully completed is transmitted from the HDD 10 to the host 100.

The above-described erase process is merely an example, and modifications of the above example may be implemented in some embodiments. For example, storing time data indicating when the request for executing the erase process in the nonvolatile recording unit is received may not be executed in B305. In addition, storing erase start time data in B306 may take place after the start of the execution of the erase process in B307.

Figure 4:
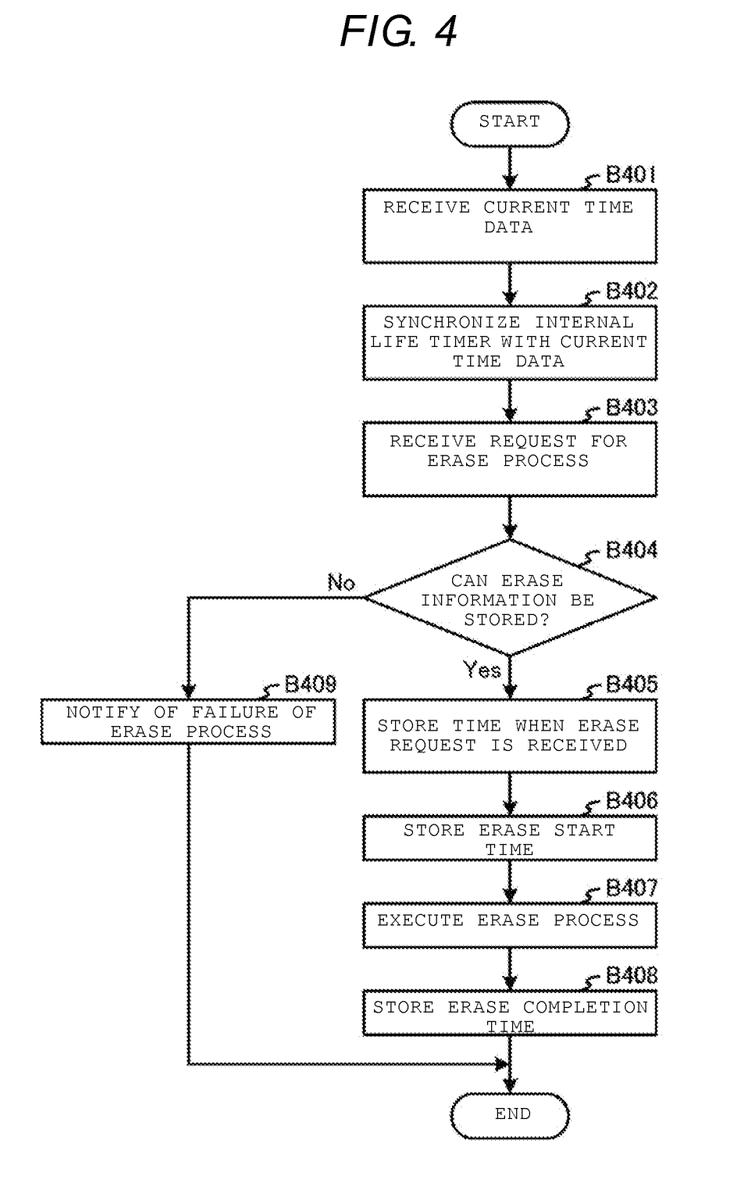
FIG. 4 is a flowchart for explaining an erase process according to an embodiment.

Next, referring to FIG. 4, the erase process executed in the HDD 10 according to an embodiment will be described. FIG. 4 is a flowchart for describing an erase process according to an embodiment.

As described above, the erase process according to an embodiment is executed by the HDD 10 that has received a command transmitted from the host 100. Before executing the erase process, the HDD 10 determines whether the erase process is to be executed. Hereinafter, the operations of the erase process will be described in detail.

First, in B401, the HDD 10 receives a message with the current time data indicating the current time from the host 100. In B402, the HDD 10 that has received the message in B401 determines a current time by synchronizing the data indicating the current time from the host 100 and a life timer value. Subsequently, in B403, the HDD 10 receives a command indicating a request to execute an erase process from the host 100. In B404, the HDD 10 that has received the command determines whether erase information can be stored.

Figure 5:
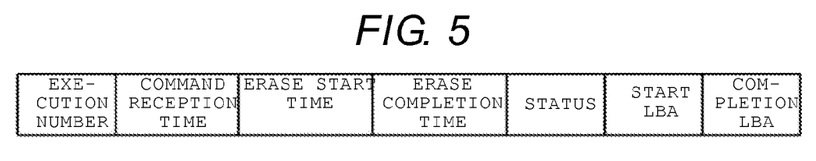
FIG. 5 is a diagram showing an example of erase information that is used in an erase process according to an embodiment.

Erase information will be described in conjunction with FIG. 5. FIG. 5 is a diagram showing an example of erase information that is used in an erase process according to an embodiment.

As shown in FIG. 5, the erase information includes information concerning executed erase processes, such as an execution number that is incremented at every execution of an erase process, an erase start time indicating a time at the start of the erase process, and an erase completion time indicating a time at the completion of the erase process. In addition, the erase information may include a receive time of an erase request indicating a time at which an erase request is received for the erase process, a status indicating a progress state of the erase process, a start LBA indicating an LBA at which the erase process is started, and a completion LBA at which the erase process is completed.

The erase information is added and stored in the nonvolatile recording unit (for example, RAM 42 or nonvolatile memory 43) without being updated. That is, the erase information concerning a particular erase process that has been executed is distinguished by the execution number to be stored. The erase information corresponding to a particular erase process is a predetermined amount of data, and a capacity of the recording region which is dedicated for storage of the erase information is limited. Therefore, according to some embodiments of the erase process, a determination is made whether the erase information can be stored each time an erase process is executed.

Referring again to FIG. 4, when it is determined that the erase information can be stored (Yes of B404), time data indicating when the request for executing the erase process was received is stored in B405, the erase start time is stored in B406, the erase process is executed in B407, and then the erase completion time is stored in B408. At that time, the series of operations including the erase process is completed. Alternatively, when it is determined that the erase information cannot be stored (No of B404), a message indicating that the erase process fails is transmitted from the HDD 10 to the host 100 through the command processing unit 201 in B409. It is noted that in this case, the series of operations including the erase process is completed.

In addition, the above-described operation is merely an example, and modified examples other than this may be implemented in other embodiments. For example, storing the time that an erase request is received in B405 in the nonvolatile recording unit may not be executed. In addition, after the start of the execution B407 of the erase process, the erase start time may be stored in B406. In addition, in some embodiments, when it is determined that the erase information cannot be stored (No of B404), a portion of the erase process (which is a process of recording an erase pattern on the magnetic disk 1 corresponding to (B407)) may be executed without executing storage of the erase information, rather than a message indicating failure of the erase process in B409.

In this manner, the erase process according to the embodiment is executed. In the erase process, all erase information that has been executed is added and stored in the nonvolatile recording unit at every execution of the erase process without being updated. Therefore, it is possible to read the information related to the executed erase process even after power supplied to the HDD 10 is cut once. That is, according to the data storage device and the data erasing method according to the embodiment, it is possible to suitably guarantee that an erase process is reliably executed.

Figure 6:
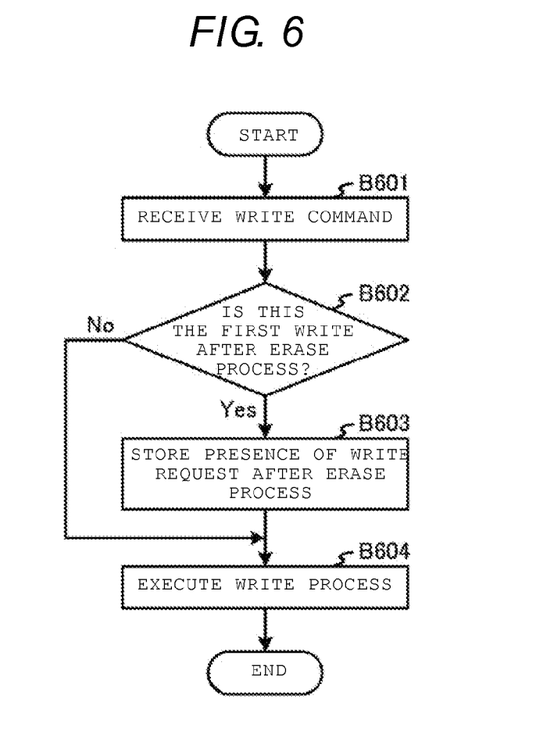
FIG. 6 is a flowchart for describing a write process after an erase process has been executed, according to an embodiment.

Next, referring to FIG. 6, a write process that is executed after the erase process is executed in the HDD 10 according to the embodiment will be described. FIG. 6 is a flowchart for describing a write process after an erase process has been executed, according to an embodiment.

In a write process according to an embodiment, prior to execution of the write process, a determination is made whether or not execution of the write process is the first execution request received by HDD 10 after executing the erase process. Based on the determination result, the write process is executed accordingly. Executing the first write process after executing the erase process invalidates the erase information. Thus, in the embodiment described herein, after the first write process has executed after executing the erase process, the erase information shown in FIG. 5 is considered invalid. Hereinafter, the operations of the write process will be described in detail.

First, in B601, the HDD 10 receives a write command from the host 100. In B602, the HDD 10 determines whether the write command is the first write command received by the HDD 10 after executing an erase process. Specifically, when the write command is received from the command processing unit 201, the write control unit 205 accesses data stored in the nonvolatile recording unit through the memory control unit 202. In the nonvolatile recording unit, data indicating whether a write command received after the erase process has been executed is stored.

When the received write command is the first write request after the execution of the erase processing (Yes of B602), data indicating that the write command is received after the erase processing is stored in the nonvolatile recording unit in B603. This data indicates that the erase information shown in FIG. 5 is no longer valid. Next, a write process according to the received write command is executed in B604. Meanwhile, if the received write command is not the first write request after the execution of the erase process (No of B602) (in other words, even when it is determined that a write command has been already received after the execution of the erase process), the write process according to the received write command is executed in B604.

In addition, the above-described operation example is merely an example, and modified examples other than the above-described example may be implemented in other embodiments. For example, data associated with the write process stored in the nonvolatile recording unit may be managed differently, depending on whether the write command is received after the erase process and whether the write command is executed after the erase process. In this case, after the determination of "Yes" in B602, it may be updated that the write command is received after the erase process, and it may be updated that the write command is executed after the execution of the write process in B604. In addition, in the above, the write process is described as the write process after the erase process, but even in the case of a write process before the erase process, the above-described procedures of the flowchart may be implemented. In this case, when the write command is received, the same process as the case (No of B602) in which the received write command is not the initial request after the execution of the erase processing is executed.

In this manner, the write process after the erase process according to the embodiment is executed. In the write process, whether the write process is the first execution request after the execution of the erase process is determined before executing the write process. Information used in such a determination is stored in the nonvolatile recording unit. Therefore, it is possible to track whether the first write process after the erase process has executed, even after power supplied to the HDD 10 is cut.

Figure 7:
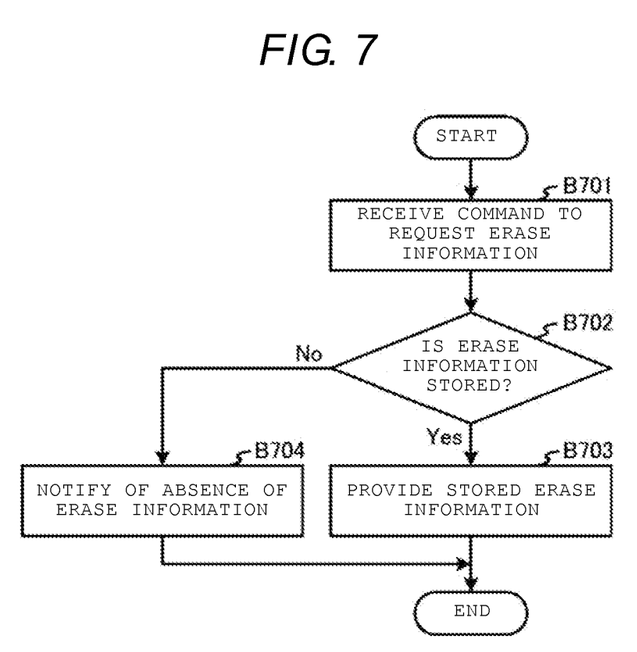
FIG. 7 is a flowchart for explaining command response process after an erase process according to an embodiment.

Next, referring to FIG. 7, operations are described of a command response process that takes place after the erase process executed in the HDD 10 according to the embodiment. FIG. 7 is a flowchart illustrating a command response process after an erase process according to an embodiment.

In a command response process, according to an embodiment, a determination is made whether erase information is stored, and a command response process is executed according to the determination result. Hereinafter, the operations of the command response process will be described in detail.

First, in B701, the HDD 10 receives a command to request erase information from the host 100. In B702, the HDD 10 that has received the command determines whether the erase information is stored in the nonvolatile recording unit. Specifically, the command processing unit 201 ascertains whether data is stored in the nonvolatile recording unit through the memory control unit 202. When it is determined that the erase information is stored in the nonvolatile recording unit (Yes of B702), the HDD 10 reads the stored erase information, and transmits this erase information to the host through the command processing unit 201 in B703. Alternatively, when it is determined that the erase information is not stored in the nonvolatile recording unit (No of B702), a message indicating that the erase information is not stored is transmitted from the HDD 10 to the host 100 through the command processing unit 201 in B704.

The above-described operation example is merely an example, and modified examples other than the operation example described above may be implemented in other embodiments. For example, it is not necessary that the command to request the erase information from the host 100 be directed to all erase information associated with the HDD 10. In some embodiments, the command transmitted from the host 100 may designate which data is requested from the stored erase information.

In this manner, the command response process after the erase process according to the embodiment is executed. In the command response process, the erase information stored in the nonvolatile recoding unit is read and returned. Therefore, it is possible to read data concerning the executed erase process even after power supplied to the HDD 10 is cut once.

According to the above-described embodiments, in accordance with a program executed in the CPU 41, the HDA or the circuit module that is part of the HDD 10 is controlled, and an erase process, the first write process executed after the erase process, and the command response process after the erase process are executed. That is, according to the data storage device and the data erasing method of the herein described embodiments, it is possible to suitably guarantee that the erase process is reliably executed, and to execute the write process and the command response process after such an erase process.

In addition, in the above-described embodiments, an example of the HDD 10 as a data storage device has been described, but the scope of the embodiments may be applied to a device (for example, SSD or memory card) using a nonvolatile semiconductor storage element (for example, NAND memory, MRAM, FeRAM, or the like) as a recording medium.

In addition, the scope of the above-described embodiments may be applied even to a hybrid type drive including a nonvolatile semiconductor storage element (for example, NAND memory, MRAM, FeRAM, or the like) as a cache application data storage device for the magnetic disk 1. In this case, the erase process, the write process after the erase process, and the command response process after the erase process according to the embodiment can be implemented in the nonvolatile semiconductor storage element serving as a cache rather than in a magnetic disk serving as a main recording medium. The nonvolatile semiconductor storage element serving as the cache is also a recording medium for recording data.

In addition, in the erase process, before the current time data is transmitted from the host 100 to the HDD 10, a mutual authentication process between the host 100 and the HDD 10 may be executed. It is possible to apply a general-purpose challenge response authentication to such a mutual authentication process. Only when a result of the mutual authentication process is successful, may the erase process be started using the current time data received from the host 100.

In addition, even the following modified example may be used instead of the above-described embodiments. For example, instead of an example in which the erase information is recorded in the nonvolatile semiconductor storage element, the erase information may be recorded in the system region of the magnetic disk 1. That is, the erase information may be stored in the nonvolatile recording unit. In addition, the counter may be implemented by a program executed in the CPU 41 instead of being included in a circuit module, including the CPU 41 based on a clock inside the HDD 10.

In addition, other than the above-described modified examples, in the erase process, when a current time is computed based on time data from the host 100 and from a life timer value for the HDD 10, a process for verifying the computed current time may be executed. For example, verification is possible when there is erase information stored at some time in the past, by determining whether there is a discrepancy in a result obtained by comparing a time when adding a current time and a life timer value in the erase information and current time data transmitted from the host 100 at this time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data storage device comprising:
    a recording medium including a data region for recording data;
    a nonvolatile recording unit distinct from the data region; and
    a controller configured to:
    control recording of data in the data region;
    store, in response to a request for executing an erase process on the recording medium, first time information corresponding to a start time of the erase process in the nonvolatile recording unit;
    execute the erase process after storing the first time information; and
    store second time information corresponding to a completion time of the erase process in the nonvolatile recording unit.

2. The data storage device according to claim 1, wherein the controller is configured to store third time information corresponding to receipt of the request for executing the erase process in the nonvolatile recording unit.

3. The data storage device according to claim 1, further comprising an interface unit configured to receive a command from a host, wherein the first and second time information are each calculated based on information indicating a time included in the command transmitted from the host and time information computed in the data storage device.

4. The data storage device according to claim 1, wherein the controller is further configured to, in response to receiving a request to execute a write process on the recording medium, determine whether the received request is a first request for a write process after the execution of an erase process on the recording medium.

5. The data storage device according to claim 4, wherein the controller is further configured to, when the request to execute the write process is the first request for a write process after the execution of the erase process on the recording medium, store in the nonvolatile recording unit information indicating that the first request after the execution of the erase process is the request for the write process.

6. The data storage device according to claim 1, wherein the controller is further configured to, in response to a request for the first time information and the second time information after execution of the erase process, read the first time information and the second time information stored in the nonvolatile recording unit.

7. The data storage device according to claim 1, wherein the controller is further configured to store an execution number associated with the erase process in the nonvolatile recording unit.

8. The data storage device according to claim 1, wherein the controller is further configured to store at least one of:
    a receive time indicating a time at which the erase request is received for executing the erase process;
    a status indicator indicating a progress state of the erase process;
    a start logical block address indicating a logical block address at which the erase process is started; and
    a completion logical block address at which the erase process is completed.

9. The data storage device according to claim 1, wherein the controller is further configured to determine, prior to executing the erase process, if the first time information and the second time information can be stored in the nonvolatile recording unit.

10. The data storage device according to claim 1, wherein the erase process comprises a process of recording an erase pattern on the recording medium.

11. A data erasing method for a data storage device that includes a recording medium with a data region for recording data and a nonvolatile recording unit distinct from the data region, the data erasing method comprising:
    storing, in response to a request for executing an erase process on the recording medium, first time information corresponding to a start time of the erase process in the nonvolatile recording unit;
    executing the erase process after storing the first time information; and
    storing second time information corresponding to a completion time of the erase process in the nonvolatile recording unit.

12. The method according to claim 11, further comprising:
storing third time information corresponding to receipt of the request for executing the erase process in the nonvolatile recording unit.

13. The method according to claim 11, further comprising:
receiving a command from a host, wherein the first and second time information are each calculated based on information indicating a time included in the command transmitted from the host and time information computed in the data storage device.

14. The method according to claim 11, further comprising:
in response to receiving a request to execute a write process on the recording medium, determining whether the received request is a first request for a write process after the execution of an erase process on the recording medium.

15. The method according to claim 14, further comprising:
when the request to execute the write process is the first request for a write process after the execution of the erase process on the recording medium, storing in the nonvolatile recording unit information indicating that the first request after the execution of the erase process is the request for the write process.

16. The method according to claim 11, further comprising:
in response to a request for the first time information and the second time information after execution of the erase process, reading the first time information and the second time information stored in the nonvolatile recording unit.

17. The method according to claim 11, further comprising:
storing an execution number associated with the erase process in the nonvolatile recording unit.

18. The method according to claim 11, further comprising:
storing at least one of: a receive time indicating a time at which the erase request is received for executing the erase process; a status indicator indicating a progress state of the erase process; a start logical block address indicating a logical block address at which the erase process is started; and a completion logical block address at which the erase process is completed.

19. The method according to claim 11, further comprising:
determining, prior to executing the erase process, if the first time information and the second time information can be stored in the nonvolatile recording unit.

20. The method according to claim 11, wherein the erase process comprises a process of recording an erase pattern on the recording medium.

* * * * *